United States Patent [19]
Dooms et al.

[11] Patent Number: 5,663,005
[45] Date of Patent: Sep. 2, 1997

[54] SELF-SUPPORTING OR SUPPORTED PHOSPHOR SCREEN OR PANEL

[75] Inventors: Philip Dooms, Edegem; Marc Van Damme, Heverlee; Frank Louwet, Diepenbeek, all of Belgium

[73] Assignee: Agfa-Gevaert, N.V., Mortsel, Belgium

[21] Appl. No.: 688,097

[22] Filed: Jul. 29, 1996

Related U.S. Application Data

[60] Provisional application No. 60/004,798, Sep. 25, 1995.

[30] Foreign Application Priority Data

Aug. 8, 1995 [EP] European Pat. Off. .............. 95202159

[51] Int. Cl.$^6$ .............................. B32B 5/16; C09K 11/02
[52] U.S. Cl. ...................... 428/690; 428/691; 250/483.1; 250/484.2; 252/301.36; 156/67; 156/307.1; 156/307.5
[58] Field of Search ...................... 428/690, 691; 250/483.1, 484.2; 252/301.36; 156/67, 307.1, 307.5

[56] References Cited

U.S. PATENT DOCUMENTS

| | | | |
|---|---|---|---|
| 4,608,301 | 8/1986 | Ishizuka et al. | 428/328 |
| 5,569,530 | 10/1996 | Doomes et al. | 428/323 |

FOREIGN PATENT DOCUMENTS

| | | |
|---|---|---|
| WO94/00530 | 1/1994 | WIPO. |
| WO94/00531 | 1/1994 | WIPO. |

*Primary Examiner*—Charles Nold
*Attorney, Agent, or Firm*—Breiner & Breiner

[57] ABSTRACT

A screen, comprising a self-supporting or supported phosphor layer with phosphor particles (PP) dispersed in a polymeric binder (B), said phosphor particles (PP) being present in said binder (B) in a volume ratio PP/B of at least 80/20 is provided wherein the polymeric binder comprises at least one polymer (P) having a $T_g \leq 0°$ C., an average molecular weight ($MG_{avg}$) between 5000 and $10^7$, being soluble in ethylacetate for at least 5% by weight (% wt/wt) and a self-supporting layer of said polymer P comprising 82% by volume of phosphor particles and having a tickhess so has to comprise 100 mg of phosphor particles per cm$^2$, has an elongation at break of at least 1%.

The screen or panel shows low screen structure mottle and a very good compromise between speed and resolution.

10 Claims, 1 Drawing Sheet

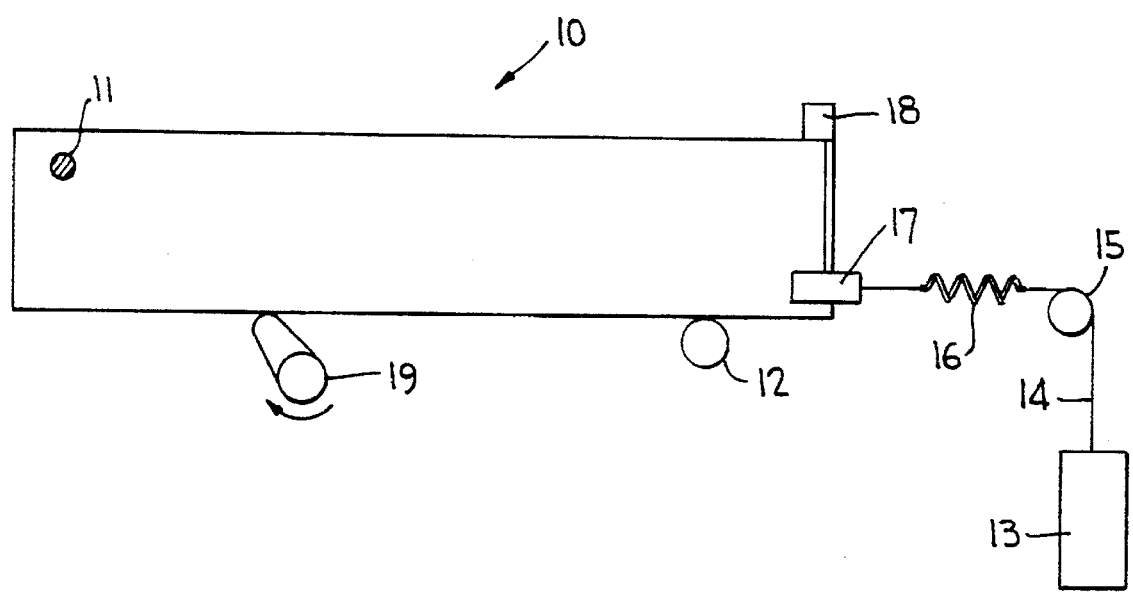

SELF-SUPPORTING OR SUPPORTED PHOSPHOR SCREEN OR PANEL

This application claims the benefit of U.S. Provisional Application No. 60/004,798 filed Sep. 25, 1995.

DESCRIPTION

1. Field of the Invention

The present invention relates to an element for recording penetrating radiation comprising a supported or non-supported layer of phosphor particles in a binder. The phosphor particles in the layer can be particles of prompt emitting phosphors or particles of stimulable phosphors (storage phosphors).

2. Background of the Invention

In radiography the interior of objects is reproduced by means of penetrating radiation which is high energy radiation belonging to the class of X-rays, γ-rays and high energy elementary particle radiation, e.g. β-rays, electron beam or neutron radiation.

In a conventional radiographic system an X-ray radiograph is obtained by X-rays transmitted imagewise through an object and converted into light of corresponding intensity in a so-called intensifying screen (X-ray conversion screen) wherein prompt emitting phosphor particles absorb the transmitted X-rays and convert them into visible light and/or ultraviolet radiation whereto a photographic film is more sensitive than to the direct impact of the X-rays.

In practice the light emitted imagewise by said screen irradiates a contacting photographic silver halide emulsion layer film which after exposure is developed to form therein a silver image in conformity with the X-ray image.

For use in common medical radiography the X-ray film comprises a transparant film support double-side coated with a silver halide emulsion layer. During the X-ray irradiation said film is arranged in a cassette between two X-ray conversion screens each of them making contact with their corresponding silver halide emulsion layer.

Single side coated silver halide emulsion films combined in contact with only one screen are often used in autoradiography, in applications where improved image definition is of great importance e.g. in mammography and in particular fields of non-destructive testing (NDT) known as industrial radiography. An autoradiograph is a photographic record formed through the intermediary of penetrating radiation emitted by radioactive material contained in an object, e.g. microtome cut for biochemical research.

According to another method of recording and reproducing an X-ray pattern disclosed e.g. in U.S. Pat. No. 3,859,527 a special type of phosphor is used, known as a stimulable phosphor. A panel, comprising such a stimulable phosphor (also called storage phosphor) is exposed to incident pattern-wise modulated X-rays and as a result thereof temporarily stores therein energy contained in the X-ray radiation pattern. At some interval after the exposure, a beam of visible or infra-red light scans the storage phosphor panel to stimulate the release of stored energy as light that is detected and converted to sequential electrical signals which are processable to produce a visible image. For this purpose, the phosphor should store as much as possible of the incident X-ray energy and emit as little as possible of the stored energy until stimulated by the scanning beam. This system is called "digital radiography" or "computed radiography".

The image quality that is produced by a conventional as well as by a digital radiographic system, strongly depends on the construction of the phosphor screen. Generally, the thinner a phosphor screen at a given amount of absorption of X-rays, the better the image quality. This means that the lower the ratio of binder to phosphor of a phosphor screen, the better the image quality, attainable with that screen, will be.

Several ways to produce thin screen with high absorption, i.e. with low binder to phosphor ratio, have been proposed. The lowest binder to phophor ratio is obtained when "single crystal" screens (i.e. screens without any binder) are used. With such screens very high resolution (i.e. image sharpness) can be obtained. Such screens can be produced, e.g., by vacuum deposition of phosphor material on a substrate. However, this production method can not be used to produce high quality screens with every arbitrary phosphor available. The mentioned production method leads to the best results when phosphor crystals with high crystal symmetry are used. Phosphor having complicated crystal structures as, e.g., alkaline earth fluorohalides, tend to decompose (partially) under vacuum deposition and the production of screens by vacuum deposition, while using phosphors with complicated crystal structure is quasi impossible and leads to sub-optimal results. This means that vacuum deposition works only well with a limited number of phosphors. Moreover vacuum deposited phosphor layers have to receive special treatments to give them good physical properties. Therefore other ways reducing the thickness of the phosphor layers in screens comprising a coated layer of phosphor particles dispersed in a binder have been disclosed.

In, e.g. EP-A 393 662 it has been disclosed that thinner phosphor layers without changing the coated amounts of pigment and of binder (typically a phosphor to binder ratio of at most 70/30 in volume) are obtained by using a thermoplastic binder and to compress the coated phosphor layer containing both phosphor particles and binder at a temperature not lower than the softening point or melting point of said thermoplastic binder. This procedure does yield better image quality, but it requires an additional manipulation of the screen or panel. This additional manipulation is from an economical point of view less desirable.

A further way to diminish the thickness of the phosphor layers in screens comprising a coated layer of phosphor particles, while still coating the same amount of phosphor particles, is to increase the volume or weight ratio of phosphor particles (pigment) to the binder. This way to produce thinner phosphor layers for a given phosphor coverage can provide screens or panels with better image quality, without needing costly additional manipulations. However, decreasing the amount of binder leads to a deterioration of the physical properties of the screen due e.g. to insufficient elasticity and to brittleness of the coated phosphor layer in the screen. In e.g. EP-A 647 258 and EP-A 648 254 it is disclosed to use rubbery binders, having excellent thermoplastic properties. Screens comprising these binders show good elasticity, good adhesion, good wear resistance ere even for high phosphor to binder ratios (in the disclosures cited, the volume ratio of phosphor particles to the binder is typically higher than 70/30, and is even as high as 85/15). Screens or panels comprising rubbery binders as described above, do present good physical properties even with high pigment to binder ratio, but are sensitive to the formation of "fixed screen noise" also called "screen structure mottle" in the phosphor layer. Moreover these rubbery binders have to be dissolved in toluene or a mixture of toluene and alkanes such as hexane to provide optimal solvatation of the binder in the coating solution, thereby providing optimal flow characteristics of the coating solution. The use of these solvents is from the point of view of ecology not desirable.

Therefore there is still need to have X-ray intensifying screens and storage phosphor screens that combine good physical properties with low structure noise that can be produced in an economical and ecologically acceptable way.

3. Objects and Summary of the Invention

It is an object of the present invention to provide a prompt emitting X-ray intensifying screen or a storage phosphor screen, e.g. in the form of a plate, panel or web, comprising a phosphor-binder layer, a good elasticity, good adhesion properties between the support and the phosphor layer, low brittleness and low degradation of the said phosphor layer by ageing after frequent reuse combined with high resolution and low noise.

It is an other object of this invention to provide a prompt emitting X-ray intensifying screen or a storage phosphor screen, e.g. in the form of a plate, panel or web, comprising a phosphor-binder layer and showing reduced screen structure mottle.

It is an other object of the invention to provide a prompt emitting X-ray intensifying screen or a storage phosphor screen, e.g. in the form of a plate, panel or web, comprising a phosphor-binder layer wherein a high coating weight of phosphor particles is achieved and the thickness of the phosphor layer is minimized without any further manipulation, e.g. compressing, of said phosphor layer.

It is a further object of the invention to provide an economical and ecologically acceptable method for forming a prompt emitting X-ray intensifying screen or a storage phosphor screen, having reduced screen structure mottle, comprising the steps of (i) dispersing phosphor particles and a binder, as defined herinafter, in a solvent, (ii) applying said dispersion on a support to form a panel or screen and (iii) drying said panel or screen.

Other objects and advantages of the invention will become clear from the following description and examples.

The objects of the present invention are realized by providing a screen, comprising a self-supporting or supported layer of phosphor particles (PP) dispersed in a polymeric binder (B), said phosphor particles (PP) being present in said binder (B) in a volume ratio PP/B of at least 80/20, characterised in that (i) said polymeric binder comprises at least one polymer (P) having a $T_g \leq 0°$ C.,
(ii) said polymer (P) has an average molecular weight ($MG_{avg}$) between 5000 and $10^7$,
(iii) said polymer (P) is soluble in ethylacetate for at least 5% by weight (% wt/wt) and
(iv) a self-supporting layer of said polymer P, comprising 82% by volume of phosphor particles and having a tickhess so has to comprise 100 mg of phosphor particles per $cm^2$, has an elongation at break of at least 1%.

In a preferred embodiment said polymer (P) is soluble in ethylacetate for at least 20% by weight (% wt/wt).

In a further preferred embodiment said binder B comprises at least 60% by weight of said polymer P.

4. Brief Description of the Drawings The sole FIGURE is a diagrammatic front view representation of a testing device applied to check the physical strenght of the screens.

5. Detailed Description of the Invention

Hereinafter the word "screen" is used to encompass both supported or non-supported screens or panels comprising a prompt emitting X-ray phosphor or a storage phosphor. The word "screen" also encompasses in this disclosure a layer comprising X-ray or high energy scintillators since the invention is also useful in the preparation of layers comprising X-ray or high energy scintillators.

It has been found that screens having high speed, good image resolution, good mechanical strength, good adhesion between the support and the phosphor layer, low brittleness and low screen structure mottle could be produced, even when using polymeric binders belonging to classes of polymers that, in e.g. EP-A 647 258 and EP-A 648 254, have been disclosed not to be useful for making screens with high phosphor to binder ratio. It was found that only polymers of these classes showing a specific physical behaviour could be used. The objects of the invention, as outlined above, could be achieved by using a binder (B) comprising at least one polymer (P), soluble for at least 5% in ethylacetate and having an avarage molecular weight between 5000 and $10^7$ and a $T_g \leq 0°$ C. and when a self-supporting layer of said polymer P, comprising 82% by volume of phosphor particles and having a tickness so has to comprise 100 mg of phosphor particles per $cm^2$, had an elongation at break of at least 1% (TEST A).

The solubility in ethylacetate (EtAc) is preferably 20% by weight. The rather high solubility in ethylacetate presents the advantage that during the manufacture of the screens low boiling, polar solvents with acceptable ecologically consequences can be used and that the use of chlorinated solvents (e.g. methylenechloride or ethylene chloride) or benzene or derivatives thereof (e.g. toluene) can be avoided. The low boiling polar solvents, that can be used for preparing a screen with a binder comprising a high amount of a polymer soluble in EtAc, can also quite easily be evaporated and recycled, thus minimizing the ecological consequences.

It is preferred that said binder B comprises more than 60% by weight of said polymer P, with respect to the total weight of polymeric substances present in said binder B. More preferably, said binder B comprises at least 70% by weight of said polymer P.

A self-supporting layer of said polymer P, comprising 82% by volume of phosphor particles and having a thickness so has to comprise 100 mg of phosphor particles per $cm^2$, has preferably an elongation at break of at least 3%.

Test A: Elongation at Break

The samples for determining the elongation at break were prepared by coating the phosphor layer, from a coating solution (lacquer) comprising phosphor particles and binder in a volume ratio of phosphor particles to binder of 82/18 and with a concentration of binder between 30 and 50% by weight. The coating proceded by doctor blade coating on a siliconized paper (white paper of 120 $g/m^2$, with a LDPE-layer (a layer of low density polyethylene) of 20 $g/m^2$, which is siliconised at the PE-coated side; supplied by Papierfabrik Oberschmitten GmbH, Nidda-Oberschmitten, Germany). The viscosity of the coating composition was adjusted to 1500 mPas. The solvent for the coating composition was either ethylacetate (EtAc) or methylethylketone (MEK) or a mixture of both. The amount of coating solution per $cm^2$ was adjusted so as to have a coating weight of phosphor particles of 100 $mg/cm^2$ (±10 mg). After coating and drying, the phosphor layer was stripped away from the siliconized paper and cut into test strips having the following dimensions: length=100 mm; width=15 mm. The increase in length of a specimen at the moment of rupture was measured according to ASTM D 882-91. Therefore the test strips were placed in the grips of an INSTRON ((trade name) Frank type 81565)

and the elongation at break was measured with a testing speed of 91.67 mm/min. The percent elongation at break was calculated by dividing the extension at the moment of rupture of the specimen by the initial length of the specimen and multiplying by 100.

It has been found that the polymers, used as the at least one polymer having low $T_g$, preferably are selected from the group consisting of vinyl resins, polyesters and polyurethane resins.

It has been found that the beneficial effects (physical strenght and low screen structure mottle) of the use of polymers selected from the class of vinyl resins, polyesters and polyurethanes with a $T_g \leq 0°$ C. as binders are especially seen in phosphor layers comprising phosphor particles (PP) are present in said binder (B) in a volume ratio PP/B of at least 80/20.

When polymers with a $T_g \leq 0°$ C., even being members of the group consisting of vinyl resins, polyesters and polyurethane resins are used as sole binder resin or are present for more than 40% in phosphor layers, phosphor layers with a volume ratio of PP/B greater than 80/20, do not exhibit such good physical properties.

A first preferred class of polymers to be used as binders are the vinyl resins. According to the Whittington's dictionary of plastics this class includes all resins and polymers made from monomers containing the vinyl group $CH_2=CH-$. Examples of such ethylenic monomers include acrylates, methacrylates, vinyl esters, olefins, styrenes, crotonic acid esters, itaconic acid diesters, maleic acid diesters, fumaric acid diesters, acrylamides, acryl compounds, vinyl ethers, vinyl ketones, vinyl heterocyclic compounds, glycidyl esters, unsaturated nitriles, polyfunctional monomers, and various unsaturated acids. Particular vinylpolymers are chosen as a function of the solubility criterium and elongation at break criterium herein before.

Commercially available examples of useful vinyl resins in this invention are PLEXISOL B372 (trade name), an acrylic resin supplied by Rohm GmbH, Germany; ACRONAL 500L (copolymer of acrylic acid esters), ACRONAL 4F (poly-(n-butylacrylate)), ACRONAL 4L (poly-(n-butylacrylate)), ACRONAL 700L (co(n-butylacrylate/vinylisobutylether) and ACRONAL A150F (poly-(n-butylacrylate)) (trade names) all supplied by BASF, Germany; DURO-TAK 373-0036 (trade name), an acrylate resin supplied by National Starch & Chemical USA. The solubility in EtAc (ethylacetate) and the $T_g$ are given in table 1, immediatly below.

TABLE 1

| Polymer | Solubility in EtAc* | Tg °C. |
|---|---|---|
| PLEXISOL B372 | 30 | −23 |
| ACRONAL 500L | 40 | −40 à −50 |
| ACRONAL 4F | >98.5 | −40 |
| ACRONAL 4L | 50 | −40 |
| ACRONAL 700L | 50 | about −40 |
| ACRONAL A150F | >98.5 | −41 |
| DURO-TAK 373-0036 | >5 | <0 |

*: in % wt/wt (% by weight)

A second class of useful polymers in this invention are polyesters with $T_g \leq 0$. This class comprises all polymers in which the main polymer backbones are formed by the esterification condensation of polyfunctional alcohols and acids. Particular polyesters are chosen as a function of the solubility criterium and elongation at break criterium herein before.

Very useful polyesters are commercially available from H üls, Germany under trade name DYNAPOL (e.g. DYNAPOL 81420, with Tg−15° C.; from TOYOBO, Japan under trade name VYLON (e.g. VYLON 550 with Tg−10° C.); from SHELL, UK under trade name VITEL.

A third class of useful polymers for incorporation in a binder mixture for a screen according to the present invention, are polyurethanes. This class comprises all polymers based on the reaction product of an organic isocyanate with compounds containing hydroxyl groups. Particular polyurethanes are chosen as a function of the solubility criterium and elongation at break criterium herein before. Very useful polyurethanes are commercially available from BAYER, Germany, under the trade name DESMOLAC (e.g. DESMOLAC 2100, DESMOLAC 4200, DESMOLAC 4125, non reactive linear polyurethanes).

It is highly preferred to use as polymer P according to the present invention vinyl resins, more specifically vinyl resins comprising moieties derived from (moth)acrylic acid and/or esters of (moth)acrylic acid.

If the above mentioned polymers have functional groups, an additional crosslinking can be performed, according to methods well known in literature (M. Ooka and H Ozawa: Progress in Organic coatings, 23 (1994) 325–338 and references therein). E.g. the hardening can proceed via di- or polyisocyanates.

In order to fine tune the properties (physical and optical) of the screens comprsing a polymer according to the present invention, some polymeric additives in low amounts (i.e. in amounts of less than 40% by weight with respect to the total of polymeric substances present in the binder) can be present. Very suitable polymeric additives are e.g. DISPERSE AYD 9100, a trade name of Daniel Products Company, Jersey City, N.J. 07304, USA. This polymeric additive is a low molecular weight thermoplastic acrylic resin and is very useful to control the quality of the dispersion of the phosphor particles, binder(s) and solvent. The addition of cellulosic polymers, as, e.g., CAB-381-2, a trade name of Eastman Chemicals USA, can be used to fine tune mechanical properties of the coated and dried phosphor layer.

When calculating the weight ratio (in % by weight) of a polymer (P) according to the present invention with respect to the total weight of polymeric substances in the binder (B) of a phosphor layer it is understood that also the polymeric substances mentioned immediatly above are taken into account.

The use of polymers according to the present invention in the binder of a phophor layer wherein the volume ratio of phosphor particles (PP)/binder (B) is higher as 80/20 makes it possible to manufacture screens with high elasticity, low brittleness, high sharpness, high speed and low noise. The volume ratio of PP/B is used in this application, as it is independent of the densities of the phosphor particles (the pigment) and of the binder, while a PP/B ratio in weight is dependent on the densities of phophor and binder.

When using other well-known binder polymers as disclosed e.g. in U.S. Pat. No. 2,502,529; U.S. Pat. No. 2,887, 379; U.S. Pat. No. 3,617,285; U.S. Pat. No. 3,043,710; U.S. Pat. No. 3,300,310; U.S. Pat. No. 3,300,311 and U.S. Pat. No. 3,743,833, either alone or for more than 40%, in the binder, the pigment to binder volume ratio can not be increased to the high values as mentioned above, due mainly to physical properties, as e.g. adhesion and brittleness. For the hitherto used binder polymers, the ratio of pigment to binder was clearly limited by the lack in physical properties of the coated phosphor layers or by the presence of "screen structure mottle".

An increase in the volume ratio of phosphor to binder providing a reduction of the thickness of the coating layer for an equal phosphor coverage not only gave a better sharpness but, unexpectedly, also a higher sensitivity (i.e. higher speed).

This high sharpness is obtained without the additional step of mechanical compression of the coated phosphor layer.

The coverage of the phosphor or phosphors present as a sole phosphor or as a mixture of phosphors whether or not differing in chemical composition and present in one or more phosphor layer(s) in a screen is preferably in the range from about 300 to 2000 g/m². Said one or more phosphor layers may have the same or a different layer thickness and/or a different weight ratio amount of pigment to binder and/or a different phosphor particle size or particle size distribution. It is general knowledge that sharper images are obtained with phosphor particles of smaller average particle size, but light emission efficiency declines with decreasing particle size. Thus, the optimum mean particle size for a given application is a compromise between imaging speed and image sharpness desired. Preferred average grain sizes of the phosphor particles are in the range of 2 to 30 μm and more preferably in the range of 2 to 20 μm.

In the phosphor layer(s), any phosphor or phosphor mixture may be coated depending on the objectives that have to be attained with the manufactured intensifying or storage phosphor screens. It is possible to mix fine grain phosphors with more coarse grain phosphors to increase the packing density.

In the production of X-ray intensifying screen (i.e. screen comprising prompt emitting phosphors), comprising a polymer according to the present invention in the binder, useful phosphor are e.g. yttriumtantalate phosphors, the preparation of which is described in e.g. EP-A 011 909, EP-A 202 875 and in U.S. Pat. No. 5,064,729 or barium fluorobromide phosphors the preparation of which proceeds analogously to the preparation of barium fluorochloride phosphors described e.g. in GB 1,161,871 and 1,254,271 and in U.S. Pat. No. 4,088,894.

A very useful barium fluorobromide phosphor has the following empirical formula: $BaFBr:Eu_{0.05}$, the preparation of said phosphor being carried out in such a way that at least part of the europium-activator is in the trivalent state so that the phosphor has a high prompt emission on X-ray exposure as described e.g. in Radiology 148, p. 833–838, September 1983.

Both cited prompt emission phosphors are emitting in the near UV and blue region of the visible spectrum, i.e. mainly in a wavelength range of 360 to 450 nm, and as such can be used in conjunction with a photographic silver halide emulsion film having inherent sensitivity in that spectrum range, e.g. a duplitized silver halide emulsion layer film of the type described in GB-P 1,477,637 which has to be read therefor in conjunction herewith. Said phosphors can be coated individually into one or more phosphor layers of a screen in accordance with this invention or a phosphor composition may be made of a mixture of both phosphors in a weight ratio range of 80/20 to 20/80 as described in EP-A 435 241. By the use of a mixture it is possible to produce X-ray conversion screens that have a higher brightness than phosphor screens containing solely the tantalate phosphor, resulting in the receipt of a lower X-ray dose for the patient in medical diagnosis.

It is clear that within the scope of this invention the choice of the phosphor or phosphor mixture is not limited to the UV or blue emitting phosphors cited hereinbefore, but that also green emitting phosphors as e.g. $Gd_2O_2S:Tb$ can be used. The invention is also useful when prompt emitting phosphors emitting red light are used. It is also clear that when screens comprising green or red emitting phosphors are used it is advantageous to combine these screens with silver halide materials spectrally sensitized to the wavelength of light emitted by the screen with which they are combined.

In radiation image storage panels, comprising a polymer according to this invention in the binder, e.g. divalent europium-doped bariumfluorohalide phosphors may be used, wherein the halide-containing portion may be (1) stoichiometrically equivalent with the fluorine portion as e.g. in the phosphor described in claim 1 of U.S. Pat. No. 4,239,968, (2) may be substoichiometrically present with respect to the fluorine portion as described e.g. in EP-A 0 021 342 or 0 345 904 and U.S. Pat. No. 4,587,036, or (3) may be superstoichiometrically present with respect to the fluorine portion as described e.g. in claim 1 of U.S. Pat. No. 4,535,237. Other divalent europium activated barium fluorobromide phosphors that can be used in storage screens, comprising a polymer according to the present invention, have been described in EP-A 533 236 and in the corresponding U.S. Ser. No. 07/941,167.

Still other divalent europium activated barium fluorobromide phosphors that can be used in storage screens, comprising a polymer according to the present invention, have been described in EP-A 533 234 and in the corresponding U.S. Ser. No. 07/935,291.

Particularly suitable divalent europium barium fluorobromide phosphors for use in storage screens comprising a polymer according to this invention correspond to the empirical formula (I) of EP-A 533 236 and contain in addition to the main dopant $Eu^{2+}$ at least one alkali metal, preferably sodium or rubidium, as co-dopant. Other particularly suitable barium fluorobromide phosphors for contain in addition to the main dopant $Eu^{2+}$ at least Sm as codopant as described in EP-A 533 233 and in the corresponding U.S. Ser. No. 07/940,985.

In fact, all hitherto known storage phosphors, bariumfluorhalide phosphors, alkali metal halide phosphors, elpasolites, halosilicates, halogermanates, etc can be used in storage panels comprising a phosphor layer comprising a polymer according to the present invention.

The invention encompasses also a method for preparing a screen comprising a self-supporting or supported phosphor layer with phosphor particles (PP) dispersed in a polymeric binder (B), comprising the steps of:

(i) dissolving said binder in a solvent (S), (ii) dispersing phosphor particles in said solution of said binder (ii) applying said dispersion on a support to form a panel or screen and (iii) drying said panel or screen, wherein said phosphor particles (PP) are present in said binder (B) in a volume ratio PP/B of at least 80/20 said polymeric binder comprises at least one polymer (P) having a $T_g \leq 0°$ C., said polymer (P) has an average molecular weight ($MG_{avg}$) between 5000 and $10^7$ and is soluble in ethylacetate for ar least 5% by weight (% wt/wt). Said solvent S is preferably at least one member selected from the group consisting of lower (substituded or unsubstituted) aliphatic alcohols, ketones, methyl- or ethylesters of lower aliphatic carboxylic acids.

The phosphor layer can be applied to the support preferably by the doctor blade coating procedure, making use of subbing or interlayer layer compositions that have been described in extenso in the EP-A 510 753 and in the corresponding U.S. Ser. No. 07/871,328.

In accordance with this invention phosphor particles are mixed with dissolved polymers, in a suitable mixing ratio to prepare a dispersion. Said dispersion is uniformly applied to a substrate by a known coating technique, e.g. doctor blade coating, roll coating, gravure coating or wire bar coating, and dried rapidly to form a layer comprising phosphor particles and called hereinafter phosphor layer. The lacquer (coating solution) to be coated is preferably high viscous. It is obvious that the optimal coating viscosity will depend on the coating technique used.

Further mechanical treatments, like compression, to lower the void ratio are not required within the scope of this invention. It has been found advantageous in the method according to the present invention, to use a solvent S at least one low boiling polar solvent selected from the group of lower (substituted or unsubstituted) aliphatic alcohols, ketones, methyl- or ethylesters of lower aliphatic carboxylic acids and mixtures. Lower aliphitic alcohols and lower aliphitic carboxylic esters are alcohols or acid comprising at most 6 carbon atoms. Very useful solvents are e.g. 2-propanol, 1-methoxy-2-propanol, methylethylketone, 2-4-pentanedione, ethylacetate or mixtures thereof.

The use of the solvents above, do present many advantages both in screen quality, recovery of the phosphor of worn-out screens is easier, the solvents are readily evaporated at low temperature, are easily recovered and present relatively low hazards during manipulation.

The coating dispersion may further contain a filler (reflecting or absorbing) or may be colored by a colorant capable of absorbing light within the spectrum emitted by the phosphor or capable of absorbing excitation light in the case of a stimulable X-ray conversion screen. Examples of colorants include SOLVENT ORANGE 71 (DIARESIN RED 7), SOLVENT VIOLET 32 (DIARESIN VIOLET A), SOLVENT YELLOW 103 (DIARESIN YELLOW C) and SOLVENT GREEN 20 (trade names of Mitsubishi Chemical Industries, Japan), MAKROLEX ROT GS, MAKROLEX ROT EG, MAKROLEX ROT E2G, HELIOECHTGELB 4G and HELIOECHTGELB HRN (trade names of Bayer, Leverkusen, Germany), NEOZAPONFEUERROT G and ZAPONECHTBRAUN BE (trade names of BASF, Ludwigshafen, W. Germany). The amount of fillers and/or colourants, as described immediatly above, will be has low as possible such as not to diminish the physical strength of the phosphor layers of the screens. Preferrably said fillers and/or colourants are present in at most 10% by weight with respect to the total content of polymeric substances present in the phosphor layer.

In the preparation of a radiographic screen, one or more additional layers are occasionally provided between the support and the phosphor containing layer, having subbing or interlayer layer compositions, so as to improve the bonding between the support and the phosphor layer, or to improve the speed of the screen or the sharpness and resolution of an image provided thereby. For instance, a subbing layer or an adhesive layer may be provided by coating polymer material such as gelatin over the surface of the support on the phosphor layer side. A light-reflecting layer may be provided, e.g. by vacuum-depositing an aluminium layer or by coating a pigment-binder layer wherein the pigment is e.g. titanium dioxide. For the manufacture of light-absorbing layer, serving as anti-halation layer, carbon black dispersed in a binder may be used but also any known anti-halation dye. Such additional layer(s) may be coated on the support either as a backing layer or interposed between the support and the phosphor containing layer(s). Several of said additional layers may be applied in combination, but the structure, number, thickness, etc of these additional layers has to be controlled to keep the physical strenght of screens, comprising a binder according to the invention, intact.

It is possible to manufacture also gradual screens, i.e. screens having a gradual intensification along their length and/or width, using a binder comprising a polymer according to the present invention or by the method outlined above. Graduality can be achieved by any technique know iin the art.

After the formation of the phosphor layer, a protective layer is generally provided on top of the phosphor layer. The roughness of the topcoat layer of especially intensifying screens offers the advantage that sticking phenomena between a film and an intensifying screen(s) in a cassette are substantially avoided even after intimate contact due to pressure build-up in the cassette system, as described in EP-A 510 754.

In relation to transport characteristics of a film in a cassette the use of an X-ray conversion phosphor screen having a topcoat with embossed structure favours its practically frictionless loading and unloading of a cassette and reduces considerably the built up of static electricity. The procctetive coating can be applied by any known technique. Especially useful techniques for applying a protective layer are screen-printing (silk-screen printing) or a rotary screen printing device as has been described in detail in EP-A 510 753. It is very useful to apply the protective layer from a radiation curable compositions that contain as primary components:

(1) a crosslinkable prepolymer or oligomer, (2) a reactive diluent monomer, and in the case of an UV curable formulation (3) a photoinitiator.

Examples of suitable prepolymers have been described in EP-A 207 257 and Radiat. Phys. Chem., Vol. 33, No. 5, 443–450 (1989). A survey of UV-curable coating compositions is given e.g. in the journal "Coating" September 1988, p. 348–353.

When the radiation-curing is carried out with ultraviolet radiation (UV), a photoinitiator is present in the coating composition to serve as a catalyst to initiate the polymerization of the monomers and their optional cross-linking with the pre-polymers resulting in curing of the coated protective layer composition. A photosensitizer for accelerating the effect of the photoinitiator may be present. Photoinitiators suitable for use in UV-curable coating compositions belong to the class of organic carbonyl compounds, acetophenones, benzophenones, etc. Examples of suitable photosensitizers are particular aromatic amino compounds as described e.g. in GB-P 1,314,556, 1,486,911, U.S. Pat. No. 4,255,513 and merocyanine and carbostyril compounds as described in U.S. Pat. No. 4,282,309.

To the radiation-curable coating composition there may be added a storage stabilizer, a colorant, and other additives, and then dissolved or dispersed therein to prepare the coating liquid for the protective layer. Examples of colorants that can be used in the protective layer include MAKROLEX ROT EG, MAKROLEX ROT GS and MAKROLEX ROT E2G. MAKROLEX is a trade name of Bayer AG, Leverkusen, Germany.

The protective coating can also be given an embossed structure following the coating stage by passing the uncured or slightly cured coating through the nip of pressure rollers wherein the roller contacting said coating has a micro-relief structure as described in e.g. U.S. Pat. No. 3,959,546.

A variety of other optional compounds can be included in the radiation-curable coating composition of the present radiographic article such as compounds to reduce static electrical charge accumulation, plasticizers, matting agents, lubricants, defoamers and the like as has been described in EP-A 510 753.

Useful additives for the protective coating are described in the Chemistry & Technology of UV & EB formulation for coatings, N. S. Allen, M. A. Johnson, P. K. T. Oldring, M. S. Salim; Ed; P. K. T. Oldring, e.g. silicone(meth)acrylates, or F-containing monomers which can be incorporated are fluorinated olefins and esters such as for example FLUOWET AC, FLUOWET MA trade names of Hoechst AG, Germany; FLUORAD FX-13, FX-14 AND FX-189 trade name of MMM, USA.

In EP-A 510 753 a description has also been given of the apparatus and methods for curing, as well as a non-limitative survey of X-ray conversion screen phosphors, of photostimulable phosphors and of binders of the phosphor containing layer.

The edges of the screen, being especially vulnerable by multiple manipulation, may be reinforced by covering the edges (side surfaces) with a polymer material being formed essentially from a moisture-hardened polymer composition prepared according to EP-A 541 146 or the corresponding U.S. Ser. No. 7/963,999.

Support materials for radiographic screens in accordance with the present invention include cardboard, plastic films such as films of cellulose acetate, polyvinyl chloride, polyvinyl acetate, polyacrylonitrile, polystyrene, polyester, polyethylene terephthalate, polyamide, polyimide, cellulose triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. A plastic film is preferably employed as the support material.

The plastic film may contain a light-absorbing material such as carbon black, or may contain a light-reflecting material such as titanium dioxide or barium sulfate. Examples of very useful supports for phosphor layers comprsing a polymer according to the present invention, include polyethylene terephthalate, clear or blue colored or black colored (e.g., LUMIRROR C, type X30 supplied by Toray Industries, Tokyo, Japan), polyethylene terephthalate filled with $TiO_2$ or with $BaSO_4$. Metals as e.g. aluminum, bismuth and the like may be deposited e.g. by vaporization techniques to get a polyester support having radiation-reflective properties.

These supports may have thicknesses which may differ depending on the material of the support, and may generally be between 60 and 1000 mm, more preferably between 80 and 500 mm from the standpoint of handling.

In common medical radiography the screens are fixed inside a cassette allowing the arrangement of a double-side coated silver halide emulsion film inbetween. In the radiographic exposure step one silver halide emulsion layer is exposed by the fluorescent light of a front screen (the screen most close to the X-ray source) and the other silver halide emulsion layer is exposed by the fluorescent light emitted by the back screen which is the screen struck by the X-rays that have penetrated already the photographic material.

Front and back screen may be asymmetrical in that e.g. their sensitometric properties, thickness, phosphor coverage and phosphor composition may be different.

Normally the screens described hereinbefore are applied for medical X-ray diagnostic applications but according to a particular embodiment the present radiographic screens may be used in non-destructive testing (NDT), of metal objects, where more energetic X-rays and g-rays are used than in medical X-ray applications. In screens applied for industrial radiography it has been found advantageous to combine the fluorescent phosphor layer with a metal layer or metal support, wherein the metal has an atomic number in the range of 46 to 83 as described e.g. in U.S. Pat. Nos. 3,872,309 and 3,389,255. The metal layer in contact with the phosphor-containing layer acts as an emitter of photoelectrons and secondary X-rays when struck by highly energetic X-rays or gamma rays. The secondary lower energy X-rays and photo-electrons are absorbed in the adjacent phosphor-containing layer at a higher efficiency than the highly energetic X-rays and gamma rays emitted by an industrial X-ray apparatus, such results in an increase in photographic speed. Said metal layers or supports have the additional advantage of reducing the scattered radiation whereby image-sharpness is improved. According to a particular embodiment described in Research Disclosure September 1979, item 18502 image-sharpness is improved by incorporating in the X-ray intensifying screen between the phosphor-containing layer and the support and/or at the rearside of the support a pigment-binder layer containing a non-fluorescent pigment being a metal compound, e.g. salt or oxide, of a heavy metal whose atomic number (Z) is at least 46. A preferred pigment used for that purpose is lead oxide (PbO) being applied e.g. at a coverage of 100 to 400 g of lead per $m^2$.

The invention is illustrated by the following examples without however limiting it thereto. All ratios are expressed by volume unless mentioned otherwise.

EXAMPLES

Measurement A: Adhesion

Adhesion properties, of a supported phosphor layer to the support, were obtained by the "cross-cut" test. With a knife, a wafer-like pattern was cut from the surface of the phosphor layer to such a depth as to reach the substrate layer. The wafer-like incisions were located at a distance of 0.5 cm and were crossing under an angle of 45°. A self-adhesive tape (TESA 4101) was sticked onto the wafer-like surface pattern and after stripping off the tape a qualitative evaluation of the adhesion quality was given in three grades:

Grade "A" refers to perfect adhesion properties as no damages are observed, grade "B" refers to moderate adhesion properties, small damages are seen and grade "C" to an insufficient adhesion, some patches of the phosphor layer are removed.

Measurement B: Sensitometry and Image Quality for Intensifying Screens

1. Exposure

Measurement B was carried out by X-ray exposure of intensifying screens according to the present invention, containing the green emitting $Gd_2O_2S:Tb$ phosphor, in combination with a radiographic film.

Pairs of screens of the same composition were arranged in the same type of cassette and between the screens and in contact therewith a same duplitized (double-side silver halide emulsion coated) film was inserted. The X-ray exposure proceeded according to ISO/DP9236 with 77 median kVp X-rays for chest exposure.

2. The film

In manufacturing the film a silver bromoiodide emulsion (2 mole % of silver iodide) was used containing silver halide grains with an average grain size of 1.25 mm. The emulsion ready for coating contained per kg an amount of silver halide corresponding to 190 g of silver nitrate and 74 g of gelatin. The emulsion was spectrally sensitized by adding 660 mg of anhydro-5,5'-dichloro-3,3'-bis(n.sulfobutyl)-9-ethyloxacarbo-cyanine hydroxide per mole silver halide. As stabilizing agents the silver halide emulsion contained per kg 545 mg of 5-methyl-7-hydroxy-s-triazolo[1,5-a] pyrimidine and 6.5 mg of 1-phenyl-5-mercaptotetrazole.

The above emulsion was coated on both sides of a polyethylene terephthalate support, carrying on both sides a subbing layer. To each of the dried silver halide emulsion layers a protective layer was applied containing 1.1 g/m$^2$ of gelatin, hardened with formaldehyd and containing perfluorocaprylic acid as an antistatic agent. The hardening proceeded by adding 0.03 grams of formaldehyde per gram of gelatin. Each silver halide emulsion layer contained an amount of silver halide equivalent with 7 g of silver nitrate per m$^2$.

3. Processing of the exposed material

The processing of the thus exposed silver halide emulsion material proceeded with the following developing liquid, followed by fixing and rinsing at the indicated temperature and processing time.

Composition of the developing liquid (pH: 10.1) (35° C., 27 s).

|  |  |
|---|---|
| Hydroquinone | 30 g/l |
| Potassium sulphite | 64 g/l |
| 1-Phenyl-3-pyrazolidinone | 1.5 g/l |
| Potassium bromide | 4 g/l |
| Glutardialdehyde | 4.7 g/l |

The pH was adjusted at 10.1 with bicarbonate/carbonate buffer.

Composition of the fixing liquid (pH: 4.3) (34° C., 18 s).

|  |  |
|---|---|
| Ammonium thiosulphate | 132 g/l |
| Sodium sulphite | 10.8 g/l |
| Aluminium sulphate | 5.4 g/l |

The pH was adjusted at 4.3 with acetic acid/acetate buffer.0

The rinsing proceeded with tap water at a temperature of 27° C. for a duration of 28 s.

4. Determination of the square wave response SWR

The determination of the SWR value for intensifying screens proceeded as described in DIN 6867, 2nd draft 1988. The SWR values were determined at 1 line pair per mm and 3 line pairs per mm (SWR1 and SWR3). The results are reported in table 4.

5. Speed measurement

The determination of the photographic speed S of said screens proceeded according to the International Standard method ISO/DP9236 (42N2063) Revised edition of November 1986. The values given in table 4 are logarithmic values, an increase by 0.30 meaning a doubling of the speed.

6. Screen structure mottle

In order to evaluate the "fixed screen noise" also called "screen structure mottle", phosphor layers were coated on a transparent PET-layer. After drying, the screen structure quality was judged by evaluating the dried phosphor layer in transmission mode on a viewing box. Tests have demonstrated that the homogenity of the phosphor layer observed in transmission mode on the viewing box correlates perfectly with the screen structure noise in the X-ray images. The examples described below are evaluated on the viewing box by 10 persons and given a score from 1 to 5. The highest score (5) represents the homogenity which correlates with the lowest screen structure noise level, i.e. the highest homogeneity. This value is reported in table 4 under the heading MOT A.

Further an uniform X-ray image (density 1 above fog, dimensions 24 cm×30 cm, X-ray exposure according to ISO/DP9236) was also evaluated regarding screen structure mottle. A score from 1 to 5 was given by 10 persons, the highest score (5) representing the lowest noise level. This value is reported in table 4 under the heading MOT A.

The score for "screen structure mottle" MOT A as well as MOT B, given in table 4 is for each screen the average of the score of the ten persons judging the screen.

Measurement C: Physical Strength of the Screens

The screens were evaluated on their physical strength in a test apparatus as illustrated in the accompanying FIGURE.

For carrying out said test the screens were cut to obtain strips of 20 cm×4 cm. In the FIGURE the strip to be tested is indicated by numeral 10. The strip 10 is perforated in the left upper corner and rotably attached to a thin fixed bar 11 and supported by another fixed bar 12. The strip 10 is put under tension in horizontal direction by means of a weight 13 (400 g) attached to string 14 that is led over a pulley 15 and fixed to a spring 16 mounted with a clamp 17 to the strip 10. The strip 10 is put under downward pressure (vertical bias) against the fixed bar 12 by means of a weight 18 (10 g) mounted in the right upper corner of the strip 10.

A rotating (500 rpm) camshaft 19 hammers against the edge of the strip to be tested, the testing proceded for 2 minutes.

The physical strenght of the screens was visualy evaluated after these two minutes testing and given a value from 0 (severe damage) to 5 (no damage visible with the naked eye). The values are reported in table 4.

Solvents Used in the Preparation of the Screens

In the preparation of the screens four different solvent mixtures were used. The composition, in % by volume, of the mixtures is given below.

| | | |
|---|---|---|
| MIX A: | Methylethylketone | 48 |
| | Methoxypropanol | 15 |
| | Ethylacetate | 37 |
| MIX B: | Methylethylketone | 48 |
| | Methoxypropanol | 15 |
| | Ethylacetate | 25 |
| | Ethanol | 7 |
| | 2-propanol | 4 |
| | Pentanedione | 1 |
| MIX C: | Methylethylketone | 50 |
| | Ethylacetate | 50 |
| MIX D: | White spirit | 50 |
| | Toluene | 50 |

In table 3 the solvent mix used for manufacturing each screen is mentioned.

Polymers Used in the Preparation of the Screens

In table 2, the polymers used in the preparations of the screens are tabulated. In this table the trade names are used, these trade names have been identified herein above.

TABLE 2

| Polymer n° | Trade name | Tg in °C. | Soluble* |
|---|---|---|---|
| P1 (NI)** | CAB-381-2[(1)] | 133 | Y |
| P2 (I) | PLEXISOL B732[(2)] | −23 | Y |
| P3 (I) | DUROTAK 373[(3)] | <0 | Y |
| P4 (I) | ACRONAL 500L[(4)] | −40 à −50 | Y |
| P5 (NI) | KRATON FG1901X[(5)] | n.a. | N |

*Y is at least soluble for 5% by weight in ethylacetate, N soluble for less than 5% by weight.
** NI is a polymer NOT according to the present invention, I is a polymer according to the present invention.
[(1)]a cellulosic polymer supplied by Eastman Chemicals USA
[(2)]an acrylic resin supplied by Rohm GmbH, Germany
[(3)]an acrylate resin supplied by National Starch & Chemical USA
[(4)]copolymer of acrylic acid esters supplied by BASF, Germany
[(5)]a rubber supplied by SHELL, UK

Preparation of the Screens

The screens were coated from a coating composition comprising $Gd_2O_2S:Tb$ phosphor. The phosphor used for these examples had a mean particle size of 5 μm. The composition was doctor blade coated onto a subbed 200 mm thick black polyethylene terephthalate support and dried.

For the measurement of the elongation at break, according to TEST A herinabove, the same coating compositions were also coated on a siliconized paper, as described in TEST A, hereinabove. After drying the phosphor layer was seperated from the paper in order to obtain the phosphor layer as a individual (self-supporting) layer. The coating compositions, coating weight of the various supported screens and the elongation at break of the various self-supporting layers are summarized in table 3.

TABLE 3

| N° | Binder composition[††] | Solvent | PP/B* | CW** mg/cm² | Elong*** % |
|---|---|---|---|---|---|
| CE1 | P2/DA[+]/P1, 1.2/0/1.8 | MIX A | 82/18 | 59 | 0 |
| CE2 | P2/DA/P1, 1.2/0/1.8 | MIX A | 64/36 | 64 | 0 |
| E1 | P2/DA/P1, 2.25/0.5/0.25 | MIX B | 82/18 | 50 | 3.24 |
| E2 | P3/DA/P1, 2/0.5/0.5 | MIX B | 82/18 | 62 | 9.06 |
| E3 | P3/DA/P1, 2/0.5/0.5 | MIX B | 82/18 | 116 | 11.50 |
| E4 | P3/DA/P1, 2.5/0.5/0 | MIX B | 82/18 | 69 | 14.32 |
| E5 | P3/DA/P1, 2.5/0.5/0 | MIX B | 82/18 | 139 | 14.50 |
| CE3 | P4/DA/P1, 2/0.5/0.5 | MIX A | 82/18 | 112 | 0 |
| E6 | P4/DA/P1, 2.25/0.5/0.25 | MIX A | 82/18 | 109 | 1.48 |
| E7 | P4/DA/P1, 2.5/0.5/0 | MIX A | 82/18 | 109 | 23.23 |
| E8 | P4/DA/P1/VH[†], 2.5/0.5/0/2.5 | MIX C | 82/18 | 118 | 27.70 |
| E9 | P4/DA/P1/VH. 2.5/0.5/0/5 | MIX C | 82/18 | 114 | 31.17 |
| CE4 | P5/DA, 2.75/0.25 | MIX D | 82/18 | 54 | 12.39 |

[††]the figures indicate the relative portions of the various ingredients (by weight).
*phosphor/binder ratio in volume
**coating weight of the phosphor
***elongation at break, TEST A
[+]DA = DISPERSE AYD trade name of Daniel Products Company, Jersey City, New Jersey 07304, USA for a low molecular weight thermoplastic acrylic resin with Tg > 0.
[†]VH: hardener DESMODUR N75 (tradename of Bayer AG. Leverkusen, Germany for TABLE 3-continued

| N° | Binder composition[††] | Solvent | PP/B* | CW mg/cm² | Elong* % |
|---|---|---|---|---|---|

$O=C=N-(CH_2)_6-N$ $\begin{matrix} CONH-(CH_2)_6-N=C=O \\ CONH-(CH_2)_6-N=C=O \end{matrix}$

TABLE 4

| N° | Speed | SWR1[†] | SWR2[††] | Adhesion | Physical strenght* | MOT A | MOT B |
|---|---|---|---|---|---|---|---|
| CE1 | 0.51 | 66 | 23 | C | 0 | 4 | 4 |
| CE2 | 0.52 | 59 | 12 | A | 0 | 5 | 5 |
| E1 | 0.46 | 67 | 25 | A | 4 | 5 | 5 |
| E2 | 0.52 | 66 | 22 | A | 5 | 5 | 5 |
| E3 | 0.62 | 60 | 13 | A | 4 | 4 | 4 |
| E4 | 0.55 | 65 | 20 | A | 5 | 5 | 5 |
| E5 | 0.62 | 60 | 12 | B | 5 | 4 | 4 |
| CE3 | 0.61 | 59 | 13 | C | 1 | 3 | 4 |
| E6 | 0.61 | 60 | 13 | B | 3 | 4 | 4 |
| E7 | 0.61 | 60 | 13 | A | 5 | 4 | 5 |
| E8 | 0.60 | 58 | 12 | A | 5 | 4 | 5 |
| E9 | 0.61 | 59 | 12 | B | 5 | 3 | 4 |
| CE4 | 0.50 | 66 | 23 | A | 5 | 1 | 2 |

*according to measurement C
[†]in at 1 line pair/mm
[††]in at 3 line pairs/mm

We claim:
1. A screen, comprising a self-supportin or supported phosphor layer with phosphor particles (PP) dispersed in a polymeric binder (B), said phosphor particles (PP) being present in said binder (B) in a volume ratio PP/B of at least 80/20 characterized in that
   (i) said polymeric binder comprises at least one polymer (P) having a $T_g \leq 0°$ C.,
   (ii) said polymer (P) has an average molecular weight ($MG_{avg}$) between 5000 and $10^7$,
   (iii) said polymer (P) is soluble in ethylacetate for at least 5% by weight (% wt/wt) and (iv) a self-supporting layer of said polymer P, comprising 82% by volume of phosphor particles and having a thickness so as to comprise 100 mg of phosphor particles per $cm^2$, has an elongation at break of at least 1%.

2. A screen according to claim 1, wherein said polymer P is soluble in ethylacetate for at least 20% by weight (% wt/wt).

3. A screen according to claim 1, wherein said binder B comprises at least 50% by weight of said polymer P, with respect to the total weight of polymeric substance present in said binder B.

4. A screen according to claim 1, wherein said binder B comprises at least 80% by weight of said polymer P, with respect to the total weight of polymeric substances present in said binder B.

5. A screen according to claim 1, wherein said self-supporting layer of said polymer comprising 82% by volume of phosphor particles and having a thickness so has to comprise 100 mg of phosphor particles per $cm^2$, has an elongation at break of at least 3%.

6. A screen according to claim 1, wherein said polymer P is at least one member selected from the group consisting of vinyl resins, polyesters and polyurethane resins.

7. A screen accoring to claim 1, wherein said layer of phosphor particles comprises a hardener.

8. A screen according to claim 7, wherein said hardener is a di- or polyisocyanate.

9. A method for preparing a screen comprising a self-supporting or supported phosphor layer with phosphor particles (PP) dispersed in a polymeric binder (B) comprising the steps of:

(i) dispersing said phosphor particles and said binder in a solvent (S), (ii) applying said dispersion on a support to form a panel or screen and (iii) drying said panel or screen, characterised in that said phosphor particles (PP) are present in said binder (B) in a volume ratio PP/B of at least 80/20 and said polymeric binder comprises at least one polymer (P) having a $T_g \leq 0°$ C., said polymer (P) has an average molecular weight ($MG_{avg}$) between 5000 and $10^7$ and is soluble in ethylacetate for ar least 5% by weight (% wt/wt) and that a self-supporting layer of said polymer P comprising 82% by volume of phosphor particles and having a thickness so has to comprise 100 mg of phosphor particles per $cm^2$, has an elongation at break of at least 1%.

10. A method according to claim 9, wherein said solvent S is at least one member selected from the group consisting of lower (substituded or unsubstituted) aliphatic alcohols, ketones, methyl- or ethylesters of lower aliphatic carboxylic acids.

* * * * *